United States Patent [19]

Simpson

[11] Patent Number: 5,061,007
[45] Date of Patent: Oct. 29, 1991

[54] TORSIONALLY ADJUSTABLE VEHICLE WING FOR UNEVEN APPLICATION OF NEGATIVE LIFT TO THE WHEELS

[76] Inventor: William E. Simpson, 696, Kaneohe, Hi. 96744

[21] Appl. No.: 434,293

[22] Filed: Nov. 13, 1989

[51] Int. Cl.$^5$ .............................................. B62D 35/00
[52] U.S. Cl. ................................... 296/180.5; 180/903
[58] Field of Search ........................... 296/180.1, 180.5; 180/903

[56] References Cited

U.S. PATENT DOCUMENTS

| | | | |
|---|---|---|---|
| 1,895,750 | 1/1933 | Brown | 296/180.5 X |
| 3,455,594 | 7/1969 | Hall et al. | 296/180.5 |
| 3,623,745 | 11/1971 | Taylor | 296/180.1 X |
| 4,629,240 | 12/1986 | Dornier | 296/180.5 |

Primary Examiner—Margaret A. Focarino
Assistant Examiner—Gary C. Hoge
Attorney, Agent, or Firm—Fleit, Jacobson, Cohn, Price, Holman & Stern

[57] ABSTRACT

A vehicle, such as a racing car, including at least one pair of opposite side support structures mounted relative to the body of the car for up and down movement relative thereto and from which at least a portion of the body is yieldingly supported is provided. An elongated wing extending at generally right angles to the center axis of the body also is provided and the wing is mounted from the body in position to be acted upon by air through which the vehicle moves and for angular displacement of the wing relative to the body about an axis generally paralleling the wing. Motion transmitting structure is operatively connected between the support structures and opposite ends of the wing to oscillatably angularly adjust the wing ends responsive to up and down oscillation of the corresponding support structures relative to the body.

16 Claims, 3 Drawing Sheets

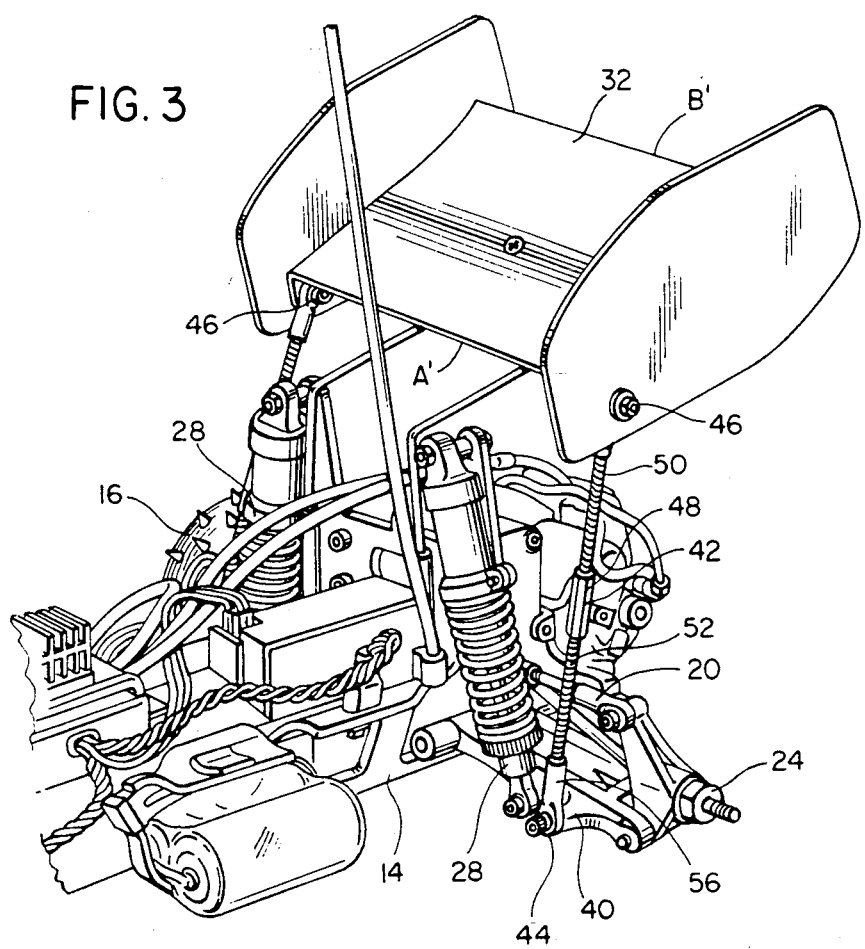
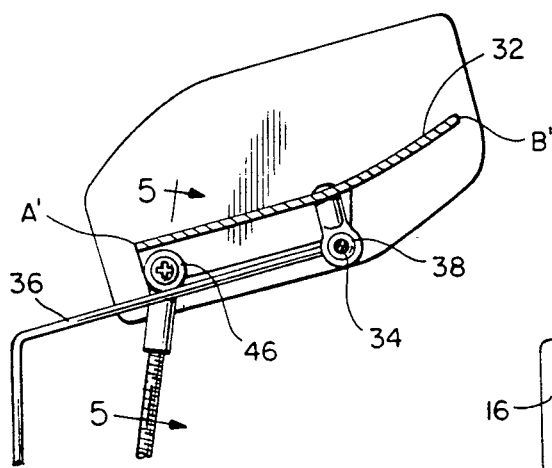
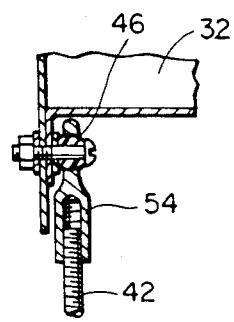
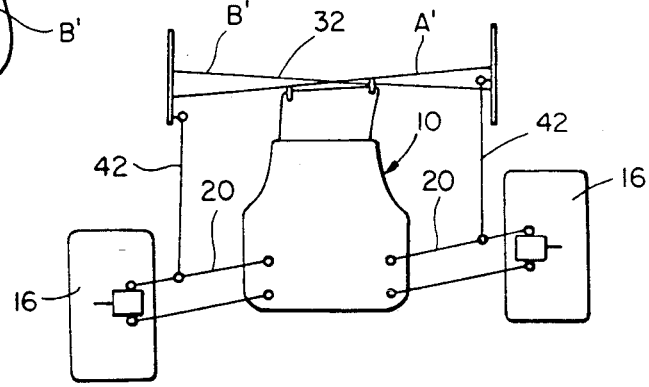

TORSIONALLY ADJUSTABLE VEHICLE WING FOR UNEVEN APPLICATION OF NEGATIVE LIFT TO THE WHEELS

BACKGROUND OF THE INVENTION

1. Field of the Invention

This invention relates to an elongated wing to be mounted in position extending at generally right angles to a vehicle body center line and with the wing mounted from the body in position to be acted upon by air through which the vehicle moves and for angular displacement of the wing relative to the body about an axis generally paralleling the wing. The wing is longitudinally torsionally flexive and adjustment structure is operatively connected between opposite side support structure portions of the vehicle and opposite ends of the wing for angularly adjusting the wing ends responsive to up and down oscillation of the vehicle support structures relative to the body thereof.

The wing of the instant invention is designed primarily for use on full size and small scale racing automotive vehicles, but also can be used advantageously in connection with other vehicles capable of moving at relatively high speeds.

2. Description of Related Art

Various different forms of full size and small scale racing automotive-type vehicles heretofore have been provided with wings or spoilers which may be adjusted, at one or both ends, according to instant racing conditions. However, these previously known forms of wings or spoilers have not included the capability of continuous adjustment thereof during vehicle racing operations and with the adjustment of the wings being wholly automatic responsive to down loading of opposite side portions of the body of the vehicle relative to corresponding opposite side support structures of the vehicle.

SUMMARY OF THE INVENTION

When scale model and full size racing cars execute turns at high speeds the outside wheels of the cars experience greater loading thereon and the inside wheels experience less loading. Accordingly, the inside and outside wheels are unevenly downwardly loaded with the result that the cornering speeds of these vehicles is limited.

Also, scale model and full size racing cars, in at least some instances, utilize wings or spoilers which are designed to exert increasing downward force, on at least the drive wheels of the cars, as the speed of the cars increases. However, this increase in downward loading on the drive wheels of racings cars usually is evenly distributed to the opposite side wheels of the cars and represents an optimum condition only when the cars are racing along straight paths, but usually results in excessive tire wear, at least on the outside driving wheels, when the racing cars are executing turns at high speeds.

Accordingly, a primary object of this invention is to provide a means by which downward forces exerted upon opposite side wheels of a racing car by wings mounted from the car bodies may be unevenly exerted to opposite side wheels of the racing cars and with the greater increase of downward loading on the racing car bodies by associated wings being to the inside wheels of the racing cars. In this manner, although the overall downward loading of a wing on a car body is maintained substantially constant, a greater portion of the downward loading on the racing car effected by a wing is experienced by the inside wheels of the racing car.

Another object of this invention is to provide an apparatus by which increases in downward loading of the wheel suspension systems of racing cars by inertia may decrease the increase in downward loading on a racing car body by the associated wing.

Another object of this invention is to provide a apparatus whereby a decrease in the downward loading of a racing car body on the wheel suspension components will result in an increase in the downward loading on the body of a racing car as a result of the associated wing.

Still another important object of this invention is to provide a wing for a racing vehicle whose angle of attack may be inversely varied, automatically, in response to variations in the downward loading of the racing vehicle on the opposite side support structures of the racing vehicle.

Yet another object of this invention is to provide a means for increasing downward loading on the opposite side support structures of a racing vehicle inversely as downward forces on the opposite side support structures of the racing vehicle are increased and decreased as a result of centrifugal forces acting upon the body of the racing vehicle while executing turns at high speeds.

A final object of this invention to be specifically enumerated herein is to provide a downward force exerting wing for a racing vehicle in accordance with the preceding objects and which will conform to conventional forms of manufacture, be of simple construction and automatic in operation so as to provide a device that will be economically feasible, long-lasting and require only initial adjustment.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary enlarged perspective view of the rear portion of the vehicle illustrated in FIG. 1 with the body thereof removed and the near side rear wheel removed in order to more clearly illustrate the operative connection between the wheel support structure and the wing for adjusting the latter;

FIG. 4 is a fragmentary enlarged longitudinal vertical sectional view illustrating the supporting pivot connections for one end of the wing;

FIG. 5 is a fragmentary vertical sectional view taken substantially upon the plane indicated by the section line 5—5 of FIG. 4;

FIG. 6 is a schematic rear elevational view illustrating the manner in which different opposite side downward loading on the wheel supporting structures of the vehicle results in inverse adjustment of the angle of attack of the opposite ends of the wing;

DESCRIPTION OF THE PREFERRED EMBODIMENT

Figure 1:
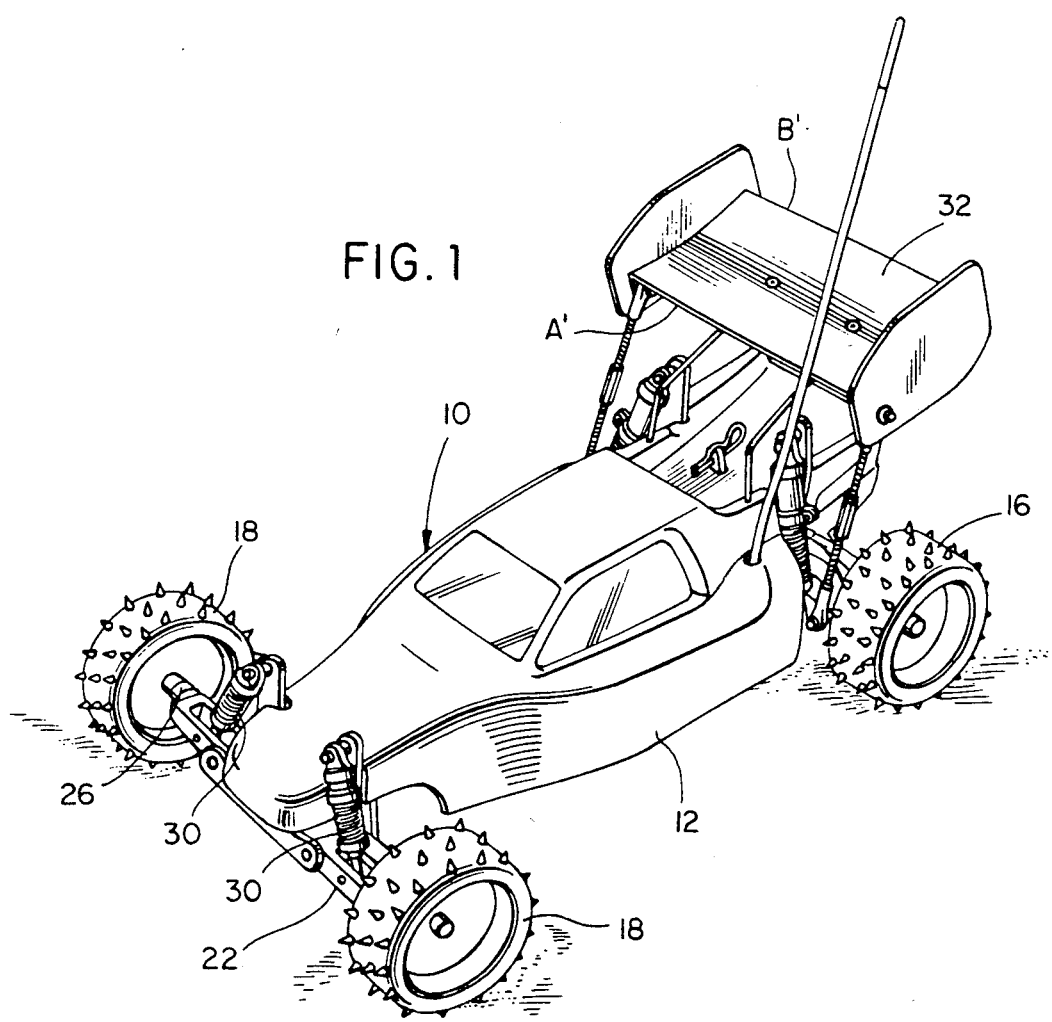
FIG. 1 is a perspective view of a scale model racing vehicle equipped with independent wheel suspension and a downward force exerting wing constructed in accordance with the present invention mounted over the rear drive wheels of the vehicle.

Referring now more specifically to the drawings the numeral 10 generally designates a high speed vehicle comprising a scale model racing car including a body 12 supported from a chassis or frame 14. In addition, the vehicle 10 includes opposite rear driving wheels 16 and front steerable wheels 18, the wheels 16 and 18 being journaled from rear and front support structures 20 and 22, respectively, including portions 24 and 26 thereof movable up and down relative to the chassis or frame 14, the wheels 16 and 18 being journaled from the portions 24 and 26.

Combined shock absorber and spring assemblies 28 and 30 are operatively connected between the chassis or frame 14 and the support structures 20 and 22 and the sprung weight of the vehicle 10 is therefore transmitted to the support structures 20 and 22 through the assemblies 28 and 30, the chassis 14 thus being yielding and force biasingly supported from the support structures 20 and 22.

In order to increase the downward loading on the rear drive wheels 16 during forward movement of the vehicle 10 at high speeds, the vehicle 10 is provided with a horizontal, elongated and transversely extending wing 32. Opposite end rear portions of the wing 32 are pivotally supported from opposite ends of the bight portion 34 of an inverted U-shaped spring rod mount 36 stationarily supported at its lower end from the chassis or frame 14. The wing 32 includes a pair of swivel connections 38 with the bight portion 34 at points spaced longitudinally along the wing 32. Thus, the wing 32 is supported from the bight 34 of the mount 36 for angular displacement relative thereto about an axis generally paralleling the bight portion 34 and extending between the connections 38.

In addition, the support structures 20 include mounting locations 40 thereon movable up and down with the portions 24 and adjustable length motion transmitting rod assemblies 42 have the lower ends thereof universally pivotally anchored to the mounting locations 40 as at 44 and their upper ends universally pivotally mounted to forward opposite end portions of the wing 32 as at 46, the connections at 38 and 46 being substantially the same. The rod assemblies 42 are in the form of turnbuckle rod assemblies including center nut portions 48 into whose opposite ends upper and lower rod sections 50 and 52 are oppositely threadedly engaged. In addition, the upper ends of the rod sections 50 and the lower ends of the rod sections 52 are threaded in ball ends 54 and 56, respectively, universally pivotally supported from the wing 32 and mounting locations 40 as at 46 and 44, respectively.

The wing 32 is to be considered as substantially stiff and shape retentive, and may be transversely arcuate as shown in FIG. 4 as well as forwardly and downwardly inclined relative to the longitudinal center axis of the vehicle 12 in order to exert a downward loading action on the rear wheels 16 of the vehicle 10 when the vehicle 10 is moving forwardly at high speed. However, the wing 32 is specially constructed such that it may be considered as torsionally flexive, that is capable of having its opposite ends relatively oppositely angularly displaced about the longitudinal center axis of the wing 32. In order to provide a wing of this type, numerous different materials may be used in the construction thereof.

If the vehicle 10 moves at high speed over the crest of a hill in manner such that inertia of the chassis or frame 14 and body 12 decreases the downward loading of the vehicle 10 on the rear wheels 16, the outboard ends of the support structures 20 swing downwardly relative to the chassis or frame 14 and the rod assemblies 42 pull downward on the forward portions of the opposite ends of the wing 32 and thus increase the forward and downward inclination of the wing 32 relative to the chassis or frame 14 to increase the downward force of the wing 32 on the rear of the vehicle 10. However, if the vehicle 10 moves at high speed over a gradual dip in the roadway and inertia of the sprung weight of the vehicle 10 increases the downward loading of the vehicle 10 on the rear wheels 16, the mounting location 40 swing upward relative to the chassis or frame 14 and the rod assemblies 42 upwardly displace the opposite end forward portions of the wing 32 in order to reduce the forward and downward angle of the wing 32 to thus reduce the downward loading on the vehicle 10 by the wing 32.

Figure 2:
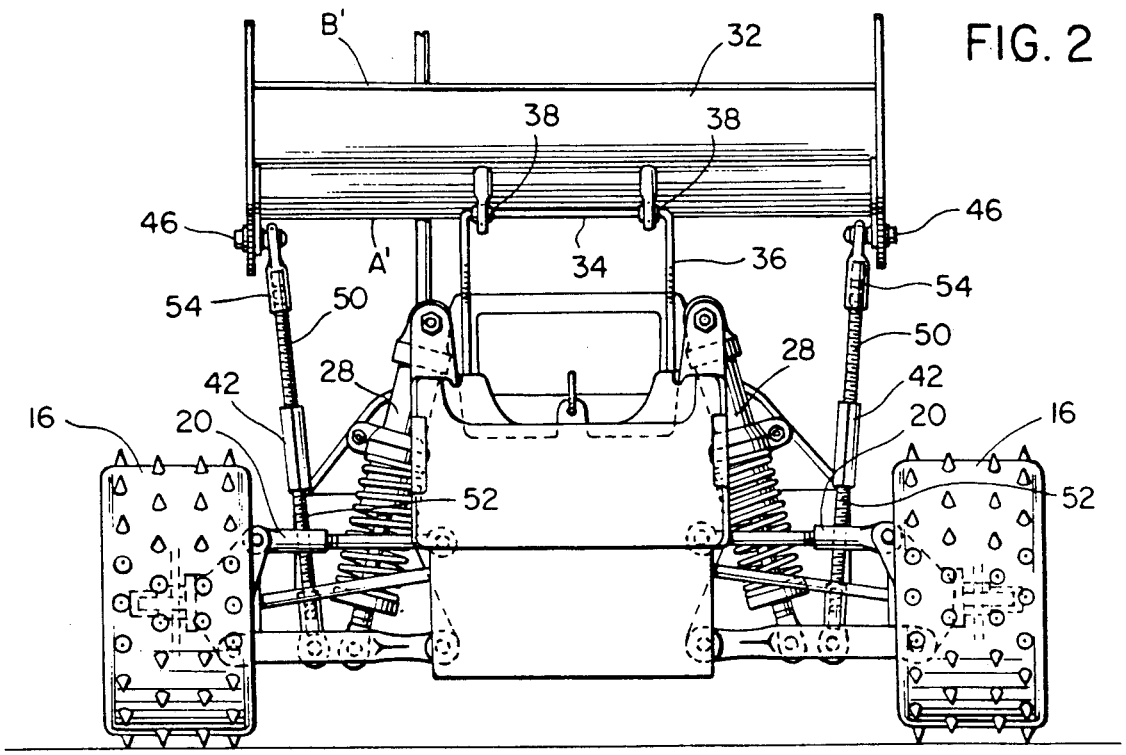
FIG. 2 is an enlarged rear elevational view of the vehicle illustrated in FIG. 1.

Still further, with attention invited FIG. 6 which represents a rear elevational view of the vehicle 10, if the vehicle 10 is executing a high speed turn to the left (on a banked turn), centrifugal force of the chassis or frame 14 and body 14 increases the downward loading on the right hand rear wheel 16 and decreases the downward loading on the left hand rear wheel 16 such that the support structure 20 on the right hand side of vehicle 10 swings upwardly and the support structure on the left hand side of vehicle swings downwardly relative to the positions thereof illustrated in FIG. 2.

This of course exerts an upward thrust on the right hand rod assembly 42 and downward pull on the left hand rod assembly 42 whereby the forward and downward angle of the right hand end of the wing 32 is reduced with the right hand end of the leading edge A' being elevated relative to the trailing edge B' and the forward and downward angle of the left end of the wing 32 is increased with the left hand end of the leading edge A' being lowered relative to the trailing edge B'. Therefore, although the centrifugal force acting upon the vehicle 10 when executing a high speed turn to the left tends to excessively load the right hand wheel 16 and unload the left hand 16, the resultant longitudinal twisting of the wing 32 enables the downward effected by the right hand end of the wing 32 to be reduced and the downward thrust effected by the left hand end of the wing 32 to be increased with the overall result that the downward loading of the vehicle 10 on the wheels 16 is more evenly distributed therebetween, thus allowing the vehicle 10 to execute the turn at a higher speed without excessive scrubbing of the tread rubber from the right hand wheel 16.

Of course, when executing a high speed turn to the right the wing 32 is reversely torsionally twisted about it longitudinal axis to have the reverse effect of increasing the downward loading on the right hand wheel 16 and decreasing the downward loading of the left hand wheel 16.

It is to be noted that the motion transmitting structures comprising the rod assemblies 42 may assume various configurations. Further, the location of the pivot connections at 46 forward of the pivot connections 38 may be varied, as desired. Also, the location of the pivot connections at 44 along the horizontal extent of the support structures 20 may be varied and the pivot connections at 44 may be fixed relative to the lower control arms as illustrated in FIG. 2 or the upper control arms as illustrated in FIG. 6.

If the support assemblies 26 are capable of only short vertical travel at the portions 24, the pivot connections at 46 may be shifted rearwardly toward the pivot connections 38 in order to effect a greater change in the inclination of the wing 32 responsive to minor vertical shifting of the pivot connections 44 relative to the chassis or frame 14.

Figure 7:
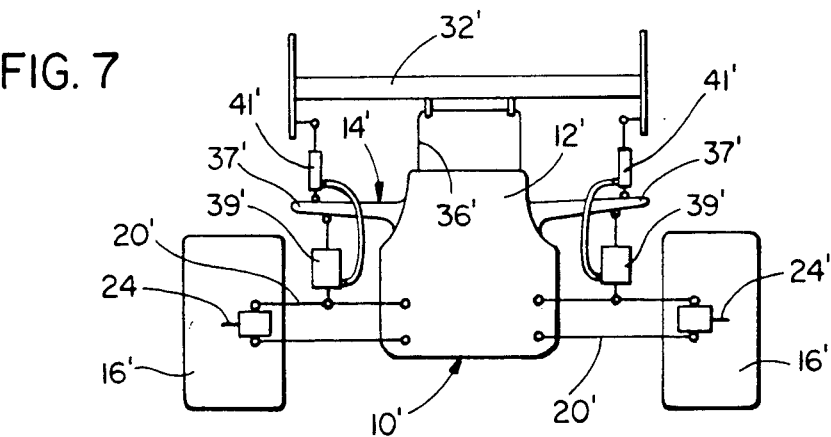
FIGS. 7 and 8 are schematic views illustrating a modified form of adjustable wing utilizing master and slave cylinders for effecting adjustments in the angle of attack of the opposite ends of the wing with FIG. 7 illustrating an equal downward loading on the opposite side wheels on the vehicle and FIG. 8 illustrating greater downward loading on the wheel support structures for the left side of the vehicle.
Figure 8:
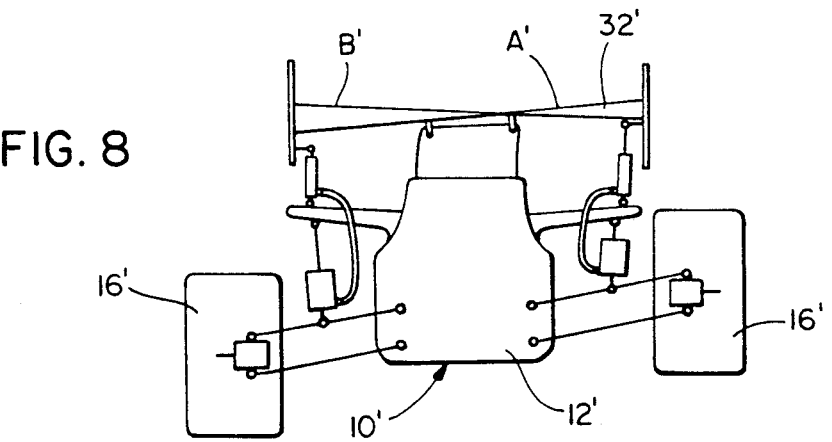
Figure 9:
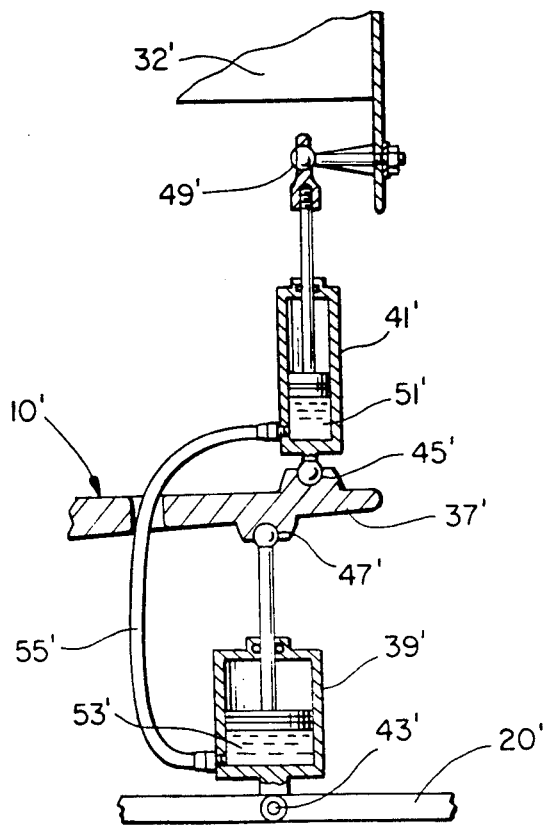
FIG. 9 is an enlarged fragmentary vertical sectional view illustrating the manner in which a larger diameter master cylinder may be used in conjunction with a smaller diameter slave cylinder in order that minimal up and down movement of a wheel support structure of the vehicle may be transformed into greater up and down movement of the corresponding wing end.

With attention invited more specifically to FIG. 7 through 9, a modified form of vehicle is referred to in general by the reference numeral 10' and includes a body portion 12' corresponding to the body 12, a wing 32' corresponding to the wing 32, rear wheels 16' corresponding to the rear wheels 16 and support structures 20' including portions 24' from which the wheels 16' are journaled. Also, a mount 36' corresponding to the mount 36 is provided and the chassis or frame 14' of the vehicle 10' includes rigid laterally outwardly projecting upper portions 37'.

Instead of being provided with rod assemblies corresponding to the assemblies 42, the vehicle 10' includes a pair of large diameter, extendable and retractable fluid master cylinders 39' interconnected between the support structures 20' and the upper portions 37' as well as smaller diameter, extendable and retractable slave cylinders 41' interconnected between the upper portions 37' and the opposite ends of the wing 32'.

As may be seen from FIG. 9 of the drawings, the lower ends of the cylinders 39' are connected to the corresponding support structures 20' through the utilization of universal pivot connection as at 43', the lower and upper ends of the cylinders 41' and 39' are connected to the corresponding upper portions 37' by ball joint connections 45' and 47' and the upper end of each of the cylinders 41' is connected, by means of a ball joint connection 49', to the corresponding end of the wing 32'.

Thus, it may be appreciated, and particularly from a comparison of FIGS. 7 and 8 with FIG. 2 and 6, the wing 32' of the vehicle 10' is changed in its angle of attack in the same manner in which the angle of attack of the wing 32 is changed. In addition, the wing 32' is also longitudinally torsionally flexive and thus may have its opposite ends twisted in opposite directions in the manner illustrated in FIG. 8 responsive to one rear wheel 16' being elevated relative to the body 12' and the other rear wheel 16' being lowered relative to the body 12'.

By using a large diameter lower cylinder 39' and a smaller diameter upper cylinder 41', a two inch reduction of the effective length of one of the cylinders 39' may be translated into an increase in the effective length of the corresponding upper cylinder 41' which is several times the reduction in effective length of the cylinder 39'. This is important if the vehicle 10' constitutes a high speed road racing vehicle wherein the total possible vertical movement of either wheel 16' relative to the body 12' may be only two or three inches.

Of course, the lower fluid chambers 51' and 53' of the cylinders 41' and the 39' are in direct communication with each other by a fluid pressure hose 55'. Also, it is pointed out that the cylinders 39' and 41' could be double acting cylinders with the chambers thereof on the sides of the corresponding pistons remote from the chambers 51' and 53' communicated through the utilization of a second fluid pressure hose (not shown). Still further, the effective length of connection between the support structure 20' and wing 32' as defined by the cylinders 39' and 41' may be adjusted merely by introducing and withdrawing fluid from the hose 55' through a T-fitting (not shown) serially connected therein between its opposite ends.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination, a vehicle including a body defining a longitudinal center axis and at least one pair of opposite side support structures mounted from said body for up and down movement relative thereto and from which the weight of the body is yieldingly supported, an elongated wing extending at generally right angles relative to said center axis, mounting means mounting said wing from said body in position to be acted upon by air through which said vehicle moves and for angular displacement of said wing relative to said body about an axis generally paralleling said wing, and adjustment means operatively connected between said support structures and wing at positions offset from said last mentioned axis operative to oscillatably angularly adjust said wing responsive to up and down oscillation of said support structures relative to said body, said wing being relatively stiff and shape retentive, but longitudinally torsionally flexive, said support structures being mounted from said body for independent up and down movement relative thereto, said adjustment means including adjustment structures operatively connected between said support structures and different end portions of said wing, whereby unequal shifting of said support structures relative to said body will result in longitudinal torsional flexure of said wing.

2. The combination of claim 1 wherein said vehicle includes opposite rear wheels journaled from said opposite side support structures.

3. The combination of claim 1 wherein said wheel mounting structures comprise opposite side rear wheel mounting structures.

4. The combination of claim 1 wherein said wing, along the length thereof, extends transversely of said vehicle.

5. The combination of claim 1 wherein said mounting means includes a pair of swivel connections with said wing disposed at points spaced longitudinally therealong and said swivel connections are stiffly but yieldingly supported from said body, said axis extending between said swivel connections.

6. The combination of claim 1 wherein said adjustment structures include upstanding, elongated motion transmitting members having lower ends connected to said support structures and upper ends connected to corresponding ends of said wings.

7. The combination of claim of 6 wherein said elongated motion transmitting members each are adjustable in effective length.

8. The combination of claim 6 wherein said upper ends of said adjustment structures are pivotally attached to said wing.

9. The combination of claim 8 wherein said one pair of wheels comprise the rear wheels of said vehicle and said upper ends of said adjustment structures are pivotally attached to said wing at points spaced forward of said axis.

10. The combination of claim 1 wherein said adjustment means includes a drive fluid cylinder connected between each support structure and said body for extension and retraction of each driving fluid cylinder responsive to down and up movement, respectively, of the corresponding support structure relative to said body and a slave fluid cylinder connected between said body and a corresponding end of said wing with the interior of each slave cylinder being in communication with the interior of the corresponding drive fluid cylinder, whereby retraction of a drive fluid cylinder will effect extension of the corresponding slave fluid cylinder.

11. In combination, a vehicle including front and rear pairs of opposite wheels and a body from which said front and rear pairs of wheels are supported, at least one pair of said wheels being journaled from portions of opposite side support structures mounted from said body for independent up and down movement relative thereto and from which at least a portion of weight of the said body is yieldingly supported, an elongated, relatively stiff and shape retentive, but longitudinally flexive wing extending transversely of said body, mounting means mounting said body wing from said boy in position to be acted upon by air through which said vehicle moves and for angular displacement of said wing relative to said body about an axis generally paralleling said wing, and adjustment means operatively connected between said support structures and opposite end portions of said wing operative to oscillatably angularly adjust said wing end portions responsive to up and down oscillation of said support structures relative to said body.

12. In combination with a vehicle including front and rear wheels journaled from a body and wherein said rear wheels are journaled from portions of opposite side support structures mounted from said body for independent up and down shifting relative thereto, an elongated, generally horizontal, relatively stiff and shape retentive, but longitudinally flexive wing, mounting means mounting said wing from said body in position to be acted upon by air through which said vehicle moves and for angular displacement of said wing relative to said body about an axis generally paralleling said wing, adjustment means operatively connected between said support structure portions and corresponding ends of said wing, laterally of the longitudinal extent of said wing relative to said axis, operative to oscillatably angularly adjust said ends of said wing responsive to up and down oscillation of said support structures relative to said body, said wing being relatively stiff and shape retentive, but longitudinally torsionally flexive.

13. The combination of claim 12 wherein said mounting means includes a pair of swivel connections with said wing disposed at points spaced longitudinally therealong and said swivel connections are stiffly but yieldingly supported from said body, said axis extending between said swivel connections.

14. The combination of claim 12 wherein said adjustment structures include upstanding elongated motion transmitting members having lower ends connected to said support structures and upper ends connected to corresponding end of said wings.

15. The combination of claim 14 wherein said elongated motion transmitting members each are adjustable in effective length.

16. The combination of claim 12 wherein said adjustment means includes a drive fluid cylinder connected between each support structure and said body for extension and retraction of each driving fluid cylinder responsive to down and up movement, respectively, of the corresponding support structure relative to said body and a slave fluid cylinder connected between said body and a corresponding end of said wing with the interior of each slave cylinder being in communication with the interior of the corresponding driving fluid cylinder, whereby retraction of a driving fluid cylinder will effect extension of the corresponding slave fluid cylinder.

* * * * *